Oct. 4, 1966  E. G. PODOLAN  3,276,814
REMOVABLE FOLDING TOP
Filed Dec. 14, 1964  2 Sheets-Sheet 1

INVENTOR.
Edward G. Podolan
BY
W. S. Pettigrew
ATTORNEY

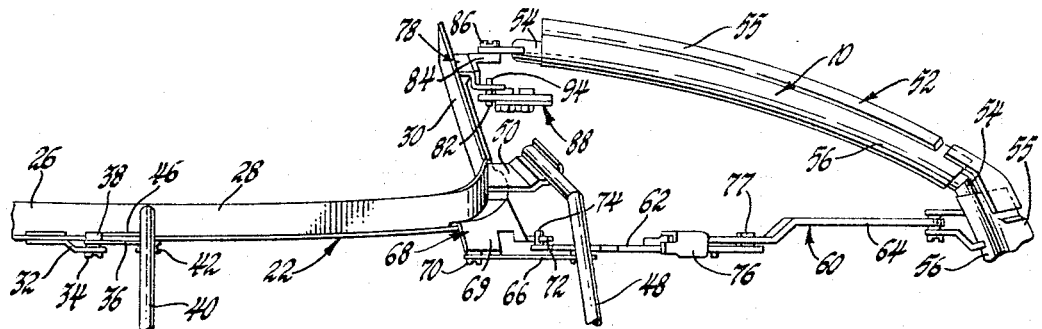

United States Patent Office 3,276,814
Patented Oct. 4, 1966

3,276,814
REMOVABLE FOLDING TOP
Edward G. Podolan, Utica, Mich., assignor to General Motors Corporation, Detroit, Mich., a corporation of Delaware
Filed Dec. 14, 1964, Ser. No. 418,215
5 Claims. (Cl. 296—107)

This invention relates generally to folding tops for convertible vehicle bodies and more particularly to a removable one-man folding top for a convertible vehicle body.

One feature of this invention is that it provides a new and improved one-man folding top which may be removed from the body and stored when not in use. Another feature of this invention is that it provides a new and improved removable one-man folding top adapted for use with convertible bodies having thin windshield header structures.

These and other features and advantages of the invention will be readily apparent from the following specification and drawings wherein:

FIGURE 1 is a side elevational sectional view of a folding top according to this invention, showing the top mounted on a vehicle body illustrated in phantom and in raised position with respect thereto;

FIGURE 2 is a view similar to FIGURE 1 showing the top in lowered position and detached from the vehicle body for storage;

FIGURE 3 is an enlarged sectional view taken generally along the plane indicated by line 3—3 of FIGURE 1;

FIGURE 4 is a fragmentary top plan view;

FIGURE 5 is an enlarged sectional view taken generally along the plane indicated by line 5—5 of FIGURE 1;

FIGURE 6 is an enlarged sectional view taken generally along the plane indicated by line 6—6 of FIGURE 1;

FIGURE 7 is an enlarged sectional view taken generally along the plane indicated by line 7—7 of FIGURE 1;

FIGURE 8 is an enlarged sectional view taken generally along the plane indicated by line 8—8 of FIGURE 1; and FIGURE 9 is an enlarged sectional view taken generally along the plane indicated by line 9—9 of FIGURE 1.

Referring now particularly to FIGURE 1 of the drawings, a folding top 10 according to this invention is provided for a convertible vehicle body indicated at 12 and including a windshield structure 14 having a thin header 16, a door 18, and a deck 20.

Folding top 10 includes a foldable frame comprising a pair of spaced foldable side rails 22 and a header cross member 24 extending transversely of the body between forward ends of the side rails 22. Only one side rail is shown in FIGURE 1, it being understood that the other side rail is similar to the one shown and differs therefrom only in hand. Side rail 22 generally comprises a series of pivotally interconnected L-shaped in section side rail portions or sections including a front rail section 26 to which is secured one end of the header 24, an intermediate rail section 28 pivotally interconnected at its forward end with a rearward end of rail section 26, and a rear rail section 30. As also shown in FIGURE 5, the pivotal interconnecting or hinge means between rail sections 26 and 28 include a bent bracket 32 welded or otherwise secured to rail section 26 and rotatably receiving a shouldered pivot stud 34 threaded into a hinge plate 36 secured to the vertical leg of rail section 28 at one side thereof and into a back nut 38 welded to plate 36.

A No. 1 bow 40 extends transversely of body 12 between the side rails 22 and, as shown in FIGURE 6, each end of the bow is pivotally mounted on a respective rail section 28 by a mounting plate 42 secured to the bow and rotatably receiving a shouldered pivot stud 44 threaded into plate 36 and into a back member 46 welded to the plate and to rail section 28. The No. 1 bow is thus adapted for pivotal folding movement relative to the side rails during folding movement of the top.

A No. 2 bow 48 extends transversely of body 12 and has each end thereof secured to a mounting bracket 50 bolted or otherwise secured to the upper end of a respective rear rail section 30. Bow 48 thus moves as a unit with the rear rail sections during top movement. A deck bow 52 extends transversely of body 12 and has each end thereof connected to the lower end of a respective rail section 30 as will be described. The deck bow includes a tubular member 54 of a curvature conforming to that of deck 20, and a plurality of form members 56 encircling member 54. The form members, as shown in FIGURE 3, are shaped with extensions 55 operative to contour the top fabric of the folding top with a pleasing appearance in the portions thereof adjacent the deck 20. The top fabric 58, indicated in phantom, is suitably secured at its forward edge to header 16, is adapted to be supported by bows 40 and 48 in the raised position of the folding top and, as shown in FIGURE 3, is cemented or otherwise secured at its rearward edge to the form members 56. Fabric 58 folds neatly with the folding top frame into a compact lowered position shown in FIGURE 2.

As shown in FIGURES 1 and 4, top erection and stiffening means for controlling and rigidifying the folding top during movement thereof to raised position includes one or more foldable linkages 60 comprising pivotally interconnected links 62 and 64 connected between deck bow 52 and side rail 22. The lower end of link 64 is pivotally secured to the deck bow and link 62 is pivotally secured adjacent its upper end to a control member 66 fixedly secured at one end thereof to bow 48 and pivotally secured at its other end to a bracket 68 welded to rail section 28. As shown best in FIGURE 7, bracket 68 is partially U-shaped in section, the member 66 being pivotally secured to one leg 69 of the bracket by a shouldered pivot stud 70 threaded into leg 69 and retained by a set screw. Bracket 68 further includes a rearward hooked end pawl portion 72 for receiving a pin 74 on the leg of the upper L-shaped end of link 62 when the folding top is in its raised position.

As the folding top is moved from raised to lowered position, linkage 62 moves from a generally unfolded position to a folded position wherein the linkage is nested intermediate the side rails and deck bow. As shown in FIGURE 8, a latch member 76 of box like cross section is slidably mounted on link 62 and is adapted to be moved over the link between a latched position wherein it is received over the upper end of link 64 and an unlatched position, shown in FIGURE 2, away from link 64 to permit relative rotation of the links. A bent out flange 77 on the lower end of link 62 prevents over-rotation of the linkage past unfolded position.

Folding top 10 is adapted to be quickly mounted on or removed from body 12 after it is placed in its lowered position by means of quick-detachable mounts on the lower ends of the rail sections 30 and on body 12. As shown in FIGURE 9, a Z-bracket 78 is bolted at one leg thereof to rail section 30 and is provided in another leg thereof with a slot 80 and a pin 82 extending inwardly of the body. An L-shaped bracket 84 secured to the intermediate leg of bracket 78 threadedly receives a pivot stud 86 rotatably mounting the respective end of member 54 of deck bow 52. A bracket assembly 88 bolted to body 12 includes a bracket portion 90 provided with a slot 92 and a pin 94 extending outboard of the body and adapted to be received in slot 80 of bracket 78. Describing first the installation of the folding top on the body, it is first placed thereon so as to locate pin 82 within slot 92. Rail section 30 and bracket 78 are then rotated counterclockwise relative to bracket portion 90 as viewed in FIGURE 2, in a manner to cam pin 94 within slot 80 until firm wedging connection is established to prevent movement or rattle of the folding top on the body. The reverse sequence is of course followed when it is desired to remove the top from the body.

In moving folding top 10 to the raised position thereof after the top is installed on the body, the operator manually lifts the side rail structure out of the nested position of FIGURE 2 to a position approaching but not reaching the position of FIGURE 1, wherein the front rail sections 26 are generally aligned with sections 28 and header 24 is located just rearwardly of header 16. In this position, a tongue 96 extending forwardly and slightly downwardly from header 24 is movable into engagement within a groove 98 provided in header 16. Folding linkage 60 has been concurrently moved toward its unfolded position, and to firmly secure the top in the raised position, the operator forces the linkage completely into this unfolded position. Prior to this completion, however, pin 74 is engaged within the hooked end of pawl 72 so that during final movement of the linkage to its unfolded position, reaction is provided by the pawl so that final rotation of link 62 occurs about pin 74 to exert a forward thrust through member 66 and into rail sections 28. This forward thrust is operative to firmly engage the tongue and groove connection 96, 98 between headers 16 and 24. Latch 76 is then placed in latched position, the engagement of pin 74 and pawl 72 and the stress in member 66 preventing both longitudinal displacement of the top, and relative rotation of rail sections 26 and 28 about stud 34.

It is apparent that exceedingly simple and light weight structure is provided for stiffening the top in raised position without requiring the aid of latches between the headers 16 and 24. Further, it is seen that such stiffening means are provided while still using side rail structures having at least three sections of such relative length as to be folded into a small package in lowered position, and then removed and stored in minimum space within the body 12 or elsewhere.

Thus a new and improved removable one-man folding top is provided.

I claim:
1. In combination with a convertible vehicle body, folding top structure comprising, a pair of spaced foldable side rails, each rail including a front rail section and a rear rail section pivotally interconnected for movement relative to each other between raised and lowered positions, a header cross member connected to said front rail sections and including holding means engageable with cooperating means on said body in said raised position of said rail sections, means quick-detachably mounting each of said rear rail sections to said body, a deck bow extending transversely of said body between said rear rail sections and engaging said body, foldable linkage means connected at one end thereof to said deck bow and at the other end thereof to said side rails, said linkage means being movable between a folded position in the lowered position of said rail sections and a generally unfolded position in the raised position of said sections, and means responsive to movement of said linkage means toward the unfolded position thereof to exert thrust on said side rails forwardly of said body to engage said holding means with said cooperating means.

2. In combination with a convertible vehicle body, folding top structure comprising, a pair of spaced foldable side rails, each rail including a front rail section and a rear rail section adapted to move relative to each other between raised and lowered positions, a header cross member connected to said front rail sections and including holding means engageable with cooperating means on said body in said raised position of said rail sections, means quick-detachably mounting each of said rear rail sections to said body, a deck bow extending transversely of said body between said rear rail sections and engaging said body, means movably interconnecting said rail sections of each side rail for coordinated movement between raised and lowered position, foldable linkage means connected at one end thereof to said deck bow and at the other end thereof to said interconnecting means, said linkage means being movable between a folded position in the lowered position of said rail sections and a generally unfolded position in the raised position of said rail sections, and means responsive to movement of said linkage means toward the unfolded position thereof to exert thrust on said front rail sections forwardly of said body to engage said holding means with said cooperating means.

3. Folding top structure as recited in claim 2, wherein said movable interconnecting means includes a second bow member extending transversely of said body and secured to said rear rail sections and control means interconnecting said second bow and said front rail sections, said other end of said foldable linkage means being connected to said control means.

4. In combination with a convertible vehicle body, folding top structure comprising, a pair of spaced foldable side rails, each rail including a front rail section and a rear rail section adapted to move relative to each other between raised and lowered positions, a header cross member extending between forward ends of said front rail sections and including holding means engageable with cooperating means on said body in said raised position of said rail sections, means for quick-detachably mounting each of said rear rail sections to said body, a deck bow extending transversely of said body and engaging said body and being pivotally connected at either end thereof with a respective rear rail section, a second bow extending transversely of said body and secured at either end thereof to a respective rear rail section, a pair of control members each secured at one end thereof to said second bow and pivotally connected at the other end thereof with a respective front rail section, a pair of foldable linkages each including a pair of links one being secured at one end thereof to said deck bow and the other being secured at one end thereof to a respective control member, said foldable linkages being movable between a folded position in the lowered position of said rail sections and a generally unfolded position in the raised position of said rail sections, and means on said one end of each of said other links and on said front rail sections engageable during movement of said rail sections toward the raised position thereof and movement of said linkages toward the unfolded position thereof to cause further movement of said linkages toward the unfolded position thereof to exert thrust through said control members to said front rail sections to engage said holding means with said cooperating means.

5. In combination with a convertible vehicle body, a folding top structure comprising, a foldable frame movable between raised and lowered positions and including a plurality of rail sections, means pivotally interconnecting a pair of said rail sections, a first bow extending transversely of said body and being pivotally connected to another of said rail sections, a second bow extending transversely of said body and being supported on said another rail section, a control member mounted on said second bow and pivotally secured to one of said pair of rail sections to interconnect said pair of rail sections and said another rail section, a foldable linkage including a pair of pivotally interconnected links one being secured at one end thereof to said first bow and the other being pivotally mounted adjacent one end thereof on said control member, said linkage being movable between a folded position in the lowered position of said frame and a generally unfolded position in the raised position of said frame, fulcrum means on said one of said pair of rail sections, and means on an extension of said one end of said other link from the pivot thereof with said control member engageable with said fulcrum means in the raised position of said top and the unfolded position of said linkage to cause said other link member to fulcrum about said fulcrum means and exert thrust through said control member on said one of said pair of rail sections to bias said pair of rail sections forwardly of said body.

References Cited by the Examiner

UNITED STATES PATENTS

| | | | |
|---|---|---|---|
| 2,040,680 | 5/1936 | Westrope | 296—107 |
| 2,823,684 | 2/1958 | Sartori | 135—6 |

BENJAMIN HERSH, *Primary Examiner.*

C. C. PARSONS, *Assistant Examiner.*